(12) United States Patent
Schulist (10) Patent No.: US 6,463,452 B1
(45) Date of Patent: Oct. 8, 2002

(54) DIGITAL VALUE PROCESSOR

(75) Inventor: Matthias Schulist, Erlangen (DE)

(73) Assignee: Telefonaktiebolaget LM Ericsson (SE)

( * ) Notice: Subject to any disclaimer, the term of this patent is extended or adjusted under 35 U.S.C. 154(b) by 0 days.

(21) Appl. No.: 09/449,626

(22) Filed: Nov. 30, 1999

(30) Foreign Application Priority Data

Nov. 30, 1998 (EP) ............................................ 98122535

(51) Int. Cl.[7] ................................................. G06F 7/38
(52) U.S. Cl. ...................................................... 708/606
(58) Field of Search ................................. 708/606, 276

(56) References Cited

U.S. PATENT DOCUMENTS

| | | | | |
|---|---|---|---|---|
| 4,787,056 A | * | 11/1988 | Dieterich | 708/606 |
| RE35,365 E | * | 10/1996 | Colavin | 708/606 |
| 5,629,885 A | * | 5/1997 | Pirson et al. | 708/606 |
| 6,298,368 B1 | * | 10/2001 | Miller, Jr. | 708/606 |
| 6,301,598 B1 | * | 10/2001 | Dierke et al. | 708/606 |

FOREIGN PATENT DOCUMENTS

| | | |
|---|---|---|
| DE | 30 30 147 A1 | 2/1982 |
| EP | 0 652 507 A1 | 5/1995 |
| GB | 2 236 608 A | 4/1991 |

* cited by examiner

*Primary Examiner*—Tan V. Mai
(74) *Attorney, Agent, or Firm*—Burns, Doane, Swecker & Mathis, L.L.P.

(57) ABSTRACT

The present application relates to a device and method for processing a digital value to thereby determine an estimate of the square of said digital value. This is done by linearly approximating the square function with the help of anchor points that are powers of 2, such that the estimate of the square of a digital value $x_a$ is determined on the basis of a first processing value $2^i$, where $2^i \leq x_a < 2^{i+1}$, and a second processing value $(3x_a - 2^{i+1})$. The present invention is advantageous in that it allows simple processing steps and a simple processing hardware. It is preferably applied to the mean signal power estimation of a digital signal being sent to a transmitter.

23 Claims, 7 Drawing Sheets

DIGITAL VALUE PROCESSOR

FIELD OF THE INVENTION

The present invention relates to a digital value processor for estimating the square of a digital value, to a corresponding method and to a mean signal power estimating device using such a digital value processor.

BACKGROUND

In digital communication systems, a digital signal needs to be analog modulated before being forwarded to a transmitter for transmission. If it is desired to monitor the output power of the transmitter, the straightforward solution consists in measuring the analog signal. However, if it is desired to measure or estimate the output power of the transmitter on the basis of the digital signal, then this can be done by monitoring the squares of the values contained in the digital signal. For example, a CDMA (code division multiple access) signal contains so called weighted chips, such that said weighted chips are an example of digital values contained in a digital signal, and a monitoring of the squares of the in-phase and quadrature phase components of the weighted chips gives an indication of the transmitter output power of the transmitter sending out said CDMA digital signal.

Consequently, in order to estimate the power of a digital signal, a means for calculating squares of digital values is required. The basic operation of multiplying a number by itself is well-known. A large number of numeric methods is known for achieving such a multiplication. Furthermore, different methods of subsampling an input stream prior to a possible power estimation are known. Algorithms based on the above described concepts are implemented in many devices, e.g. in digital signal processors.

For example, DE 40 33 507 C2 shows a circuit arrangement for the digital multiplication of integer numbers. The basic operation described in this document consists in first calculating a logarithm, then performing an adding operation, and then the operation that is inverse to calculating the logarithm. It is mentioned that the calculation of the logarithm and the inverse operation can be accelerated by using a mathematic approximation of the exponential curve. In accordance with this document, a coding unit for calculating the logarithm linearly approximates an exponential curve piece by piece in such a way that the number of linear sections is at least equal to the bit number of the respective integer number. In connection with this linear approximation, document DE 40 33 507 C2 proposes an operation based on a complicated truth table. This document however does not specifically address the calculation of squares.

There are also methods for calculating a square-root of a sum of squares, e.g. disclosed in EP 0 811 909 A1, or for estimating a mean square value, e.g. disclosed in EP 0 205 351 A1. However, eventhough these methods relate to the calculation of a term that analytically would require the calculation of a square, both methods avoid actually calculating the square of a digital value.

OBJECT OF THE INVENTION

The object of the present application is to provide a digital value processor and digital value processing method for estimating the square of a digital value that can be implemented in a simple way, i.e. with little hardware expenditure and without complicated processing steps.

SUMMARY OF THE INVENTION

This object is solved by a digital value processor according to claim 1 and a digital value processing method according to claim 14. Preferably, the digital value processing according to the invention is applied to the estimation of the mean output power of a digital signal.

The basic concept of the invention consists in using powers of 2 for calculating the square of the digital value $x_a$, in the sense that powers of 2 are used as anchor points for a linear approximation of the square function $y=x^2$. More specifically, first the two integer powers of 2 between which $x_a$ lies, i.e.

$$2^i \leq x_a < 2^{i+1} \quad (1)$$

are determined. Then $2^i$ is used as a first processing value and $(3x_a - 2^{i+1})$ is used as a second processing value for calculating an estimate $\xi_a^2$.

By basing the estimation of the square of a digital value, which is a binary number, on integer powers of 2 in the above described way, it is possible to perform all calculations by shift operations and add operations, which leads to simple processing steps and enables very simple processing hardware.

According to a preferred embodiment, the estimate $\xi_a^2$ is calculated as the product of the first and second processing value, i.e.

$$\xi_a^2 = 2^i \cdot (3x_a - 2^{i+1}) \quad (2)$$

Figure 5:
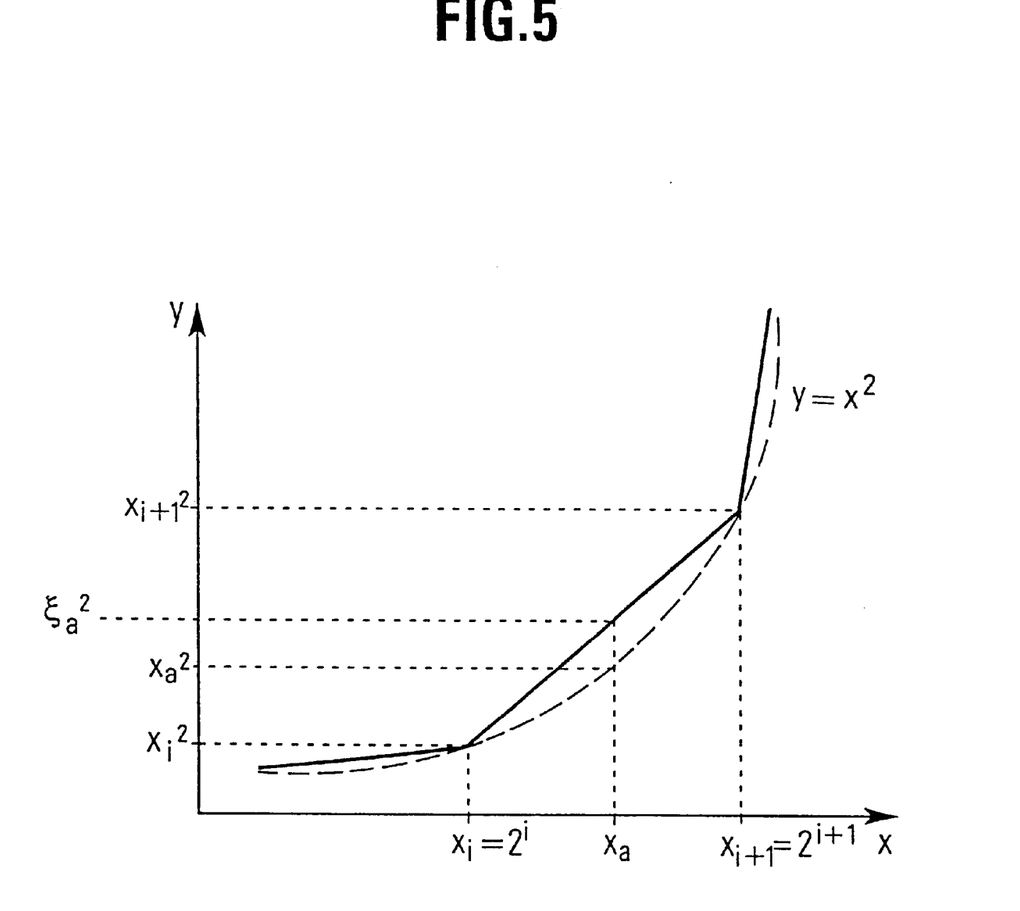
FIG. 5 explains the basic concept of estimating the square of a value $x_a$ on the basis of integer powers of 2.

This corresponds to calculating the estimate $\xi_a^2$ by linear interpolation between integer powers of 2 as anchor points, as shown in FIG. 5. This will be explained in more detail later. The calculation of the estimate can then preferably be performed only by left shift operations and add operations. According to another preferred embodiment, in which the average estimation error is reduced, the estimate $\xi_a^2$ is calculated by additionally performing a truncating operation, i.e.

$$\xi_a^2 = 2^i \cdot 2^{i-Q} \cdot \lfloor (3x_a - 2^{i+1})/2^{i-Q} \rfloor \quad (3),$$

where $\lfloor x \rfloor$ means the integer part of a real number x, i.e. the truncation operation. In this way the average estimation error is reduced. Preferably the calculation operation is performed only by left and right shift operations and add operations.

Due to the fact that the magnitude of the estimation error in the above described approximation on the basis of integer powers of 2 increases for large digital values, the device and method of the invention are preferably applied to such digital signals where the occurrence of large magnitudes is less probable. This will typically be the case for digital signals that have been generated in accordance with a constraint on the maximum output power for the analog transmitter.

BRIEF DESCRIPTION OF FIGURES

More features and advantages of the present invention will become apparent from the following detailed description of preferred embodiments, which will be done by referring to the appended figures, in which.

DETAILED DESCRIPTION

Figure 1:
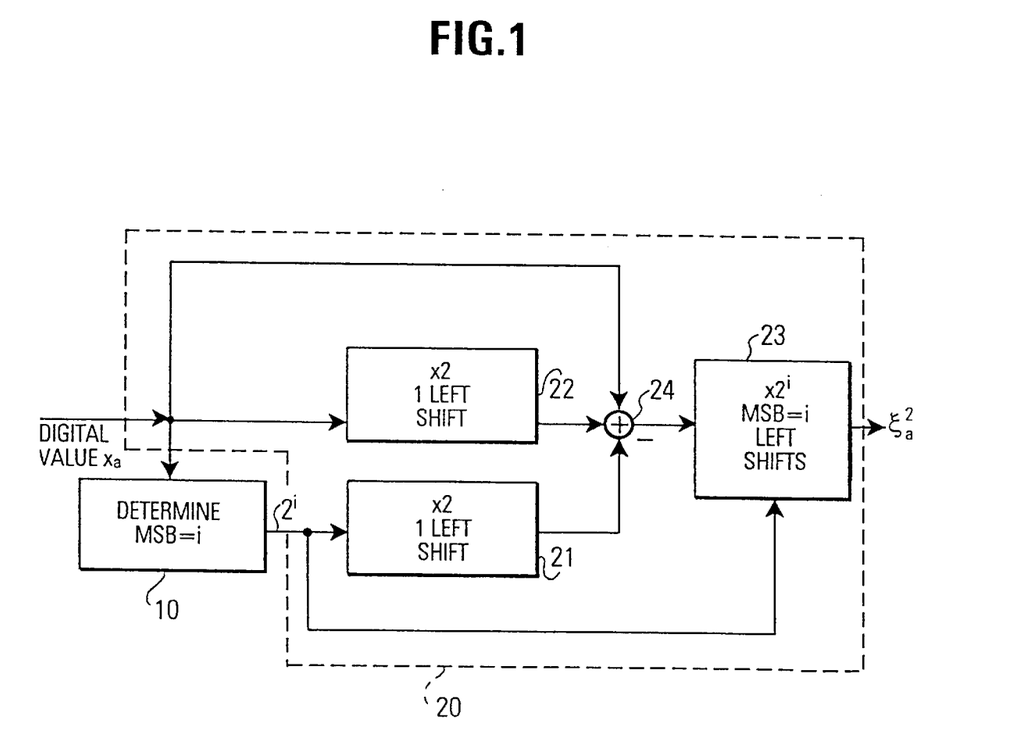
FIG. 1 shows a block diagram of an embodiment of the invention.

FIG. 1 shows a block diagram of a first embodiment of the invention. A digital value $x_a$ is entered into a determining means 10, which determines the two powers of 2 between which $x_a$ lies, i.e.

$$2^i \leq x_a < 2^{i+1} \quad (4)$$

The determining means 10 outputs the first processing value $2^i$, which is then used in the calculation means 20. The calculation means 20 calculates the second processing value $(3x_a - 2^{i+1})$ appropriately. Finally, the estimate $\xi_a^2$ is calculated from said first and second processing values.

It may be noted that here and in the following description $x_a$ is assumed to be non-negative for the purpose of a clearer and simpler description. Naturally, the present invention can also be applied to estimate the square of negative digital values. In this case, i.e. if the possibility exists that $x_a$ is negative, then the value to be entered into the determining means 10 must appropriately be made positive if necessary. This can be done in any suitable way, e.g. by placing a means before the determining means 10 and the calculation means 20, which always outputs the magnitude of the value $x_a$, such that only non-negative values are entered into the devices 10 and 20. Alternatively, it is possible to generalize the determining means 10 and calculation means 20 in a suitable way, such that non-negative and negative values may be entered into the means 10 and 20. This modification can be done in any desirable or convenient way, where its effect will be that the above described determinations and calculations (equations (1) to (4)) will be done on the basis of the magnitude $|x_a|$ instead of $x_a$ if $x_a$ is negative. As already mentioned, for the purpose of clarity the following description will assume that $x_a$ is non-negative, but it shall be understood that in the case of negative values for $x_a$, the described methods and devices must simply be modified that in effect $x_a$ is to be replaced by $|x_a|$. In other words, if negative values of $x_a$ can occur, then additional means are employed that ensure that $2^{i\,1}$ is in effect determined on the basis of $2^i \leq |x_a| < 2^{i+1}$ and the second processing value in effect as $(3|x_a| - 2^{i+1})$. "In effect" means that the magnitude itself must not necessarily be calculated, but that a result having this effect should be brought about. However, the simplest and therefore preferable way of achieveing this is to provide a means that outputs the magnitude of a value $x_a$ for which the square is to be estimated to the above described devices 10 and 20.

But it is equally well possible to modify the devices 10 and 20 themselves, such that either they determine the magnitude of the input value $x_a$, or that correspondingly modified versions of the calculation terms are employed, e.g. negative values of $2^i$, $2^{i+1}$ and/or $3x_a$. The latter possibility can e.g. be embodied by a system in which it is first determined if $x_a$ is non-negative or negative, and in which the first and second processing values are calculated from $$2^i \leq x_a < 2^{i+1} \quad (1)$$

and $$\xi_a^2 = 2^i \cdot (3x_a - 2^{i+1}) \quad (2)$$

if $x_a$ is non-negative, and from $$-2^{i+1} < x_a \leq -2^i \quad (1a)$$

and $$\xi_a^2 = 2^i \cdot (-3x_a - 2^{i+1}) = -2^i \cdot (3x_a + 2^{i+1}) \quad (2a)$$

if $x_a$ is negative.

It is evident that this has the same effect as determining the first processing value on the basis of $2^i \leq |x_a| < 2^{i+1}$ and the second processing value on the basis of $(3|x_a| - 2^{i+1})$. The present invention is intended to encompass all possibilities having this effect.

The possibilities for modifying the devices 10 and 20 are numerous and shall readily occur to the person skilled in the art, such that no further explanation is necessary.

Figure 7:
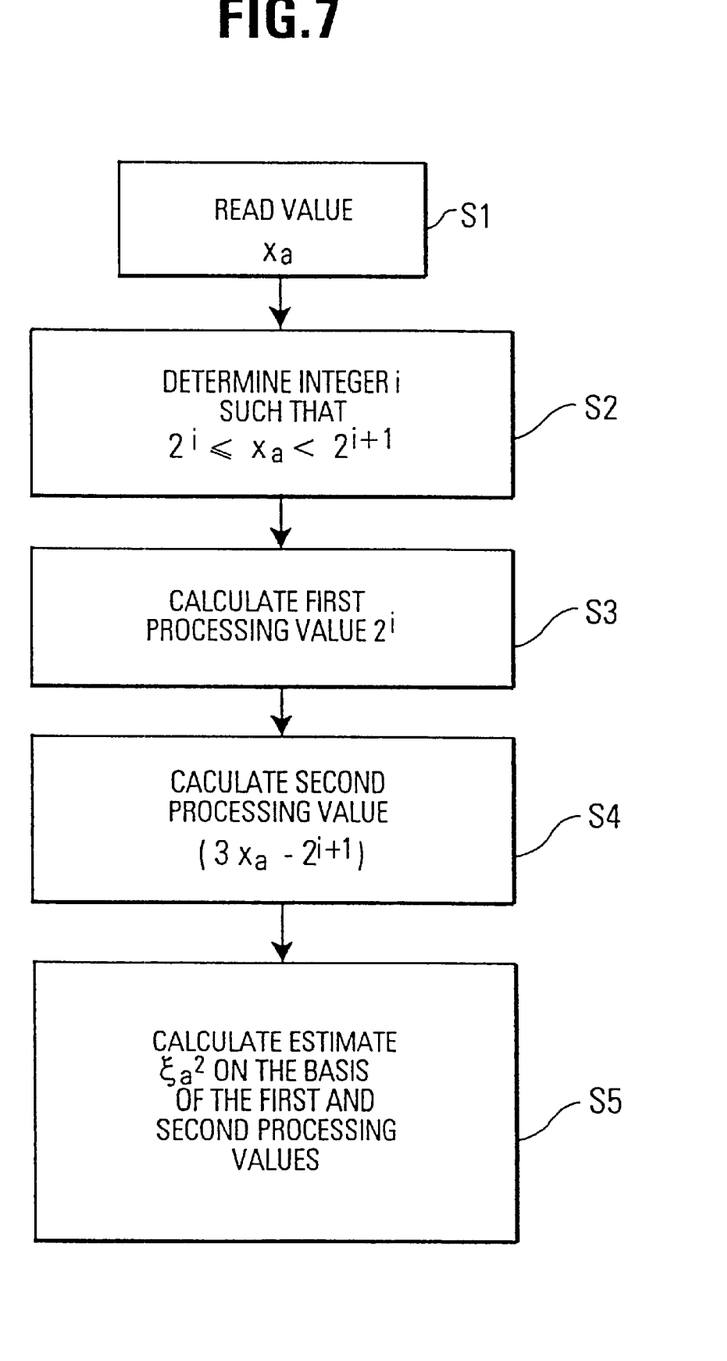
FIG. 7 shows a flow chart of the basic method of the present invention.

FIG. 7 shows a flow chart of the basic method of the present invention. In a first step S1, a digital value $x_a$ is read. Then in step S2 the integer i is determined, for which $2^i \leq x_a < 2^{i+1}$. Then a first processing value $2^i$ is calculated in step S3, after which a second processing value $(3^x_a - 2^{i+1})$ is calculated in step S4. Finally, the estimate $\xi^{a2}$ is calculated on the basis of the first and second processing values in step S5.

The processes mentioned above in connection with FIG. 1 and FIG. 7 can be performed in any suitable or desirable way. It may be noted that e.g. steps S2 and S3 may also be combined into one step, e.g. by determining the most significant bit in the digital value, and then simply outputting this most significant bit with all other bits set to zero as the correct power of 2.

Preferably, the processes for determining the first and second processing values are performed as shown in more detail in FIG. 1. More specifically, the determining means 10 in fact finds the most significant bit (MSB) of the digital value $x_a$, which is given in binary representation, and then sets the found bit position as the integer i for determining the two powers of 2 between which $x_a$ lies. For any given binary representation of a digital number (sign/magnitude, one/two complement), the determination of the MSB is well-known in the art, and does not need to be explained here. The determining means 10 then outputs a binary representation of the value $2^i$ by leaving the MSB and setting all other less significant bits to 0. As a consequence, the estimation of the square of a digital value on the basis of integer powers of two affords the advantage of a simple determination process for anchor points $2^i$, because these can easily be determined by simply finding the most significant bit in the digital value $x_a$.

Preferably, the calculation means 20 is arranged in such a way, that the second processing value is calculated by left shift operations and an adding operation. More specifically, as shown in FIG. 1, the calculating means 20 preferably has a first left shift means 21, a second left shift means 22 and an adder 24. As can be seen, the second processing value $(3x_a - 2^{i+1})$ can be determined by multiplying the digital value $x_a$ by 2 in the left shift means 22 and adding this to the digital value itself in adder 24, to thereby produce $3x_a$, from which $2^{i+1}$ is subtracted in adder 24, where $2^{i+1}$ is formed by multiplying the value $2^i$ output by the determining means 10 in the left shift means 21 by 2.

Here again, the advantage of using powers of two as anchor points in the estimation becomes evident, because operations involving the multiplication with 2 can be performed on binary numbers by simple left shift operations. In the case of left shift means 21 and 22, the multiplication by 2 is accomplished by one left shift. Circuits for performing such left shift operations are well-known in the art and therefore need not to be described here. Adding means for digital numbers are also well-known.

Preferably, the calculation circuit 20 calculates the estimate $\xi_a^2$ by multiplying the first and second processing values, i.e.

$$\xi_a^2 = 2^i \cdot (3x_a - 2^{i+1}) \qquad (5)$$

Again it is preferred that this multiplication operation also be performed by a simple left shift means 23, where the multiplication of the second processing value by $2^i$ is accomplished as a number of i left shifts. The calculating circuit 20 then outputs the estimate $\xi_a^2$ for further processing.

It is noted that although the processing by means of shift means and add means is preferable because this results in a very simple hardware implementation, other means for carrying out the processing may be used.

FIG. 5 shows the basic concept for a linear approximation of the function $y=x^2$ by using anchor points that are integer powers of 2. As can be seen, the digital value $x_a$ lies between $x_i = 2^i$ and $x^{i+1} = 2^{i+1}$. The square of $x_a$ is estimated by assuming a linear approximation of the curve $y=x^2$ between the points $x_i$ and $x_{i+}$. In other words $$\begin{aligned}\xi_a^2 &= x_i^2 + \frac{x_a - x_i}{x_{i+1} - x_i} \cdot (x_{i+1}^2 - x_i^2) \qquad (6) \\ &= x_i^2 + (x_a - x_i) \cdot (x_{i+1} + x_i) \\ &= x_a x_{i+1} - x_i x_{i+1} + x_a x_i \\ &= x_a 2x_i - x_i 2x_i + x_a x_i \\ &= x_i \cdot (3x_a - 2x_i) = 2^i \cdot (3x_a - 2^{i+1})\end{aligned}$$

As can be seen, this linear estimation of the curve $y=x^2$ between anchor points that are integer powers of 2 directly leads to the determination of the estimate $\xi_a^2$ as a product of the first and second processing values.

Figure 2:
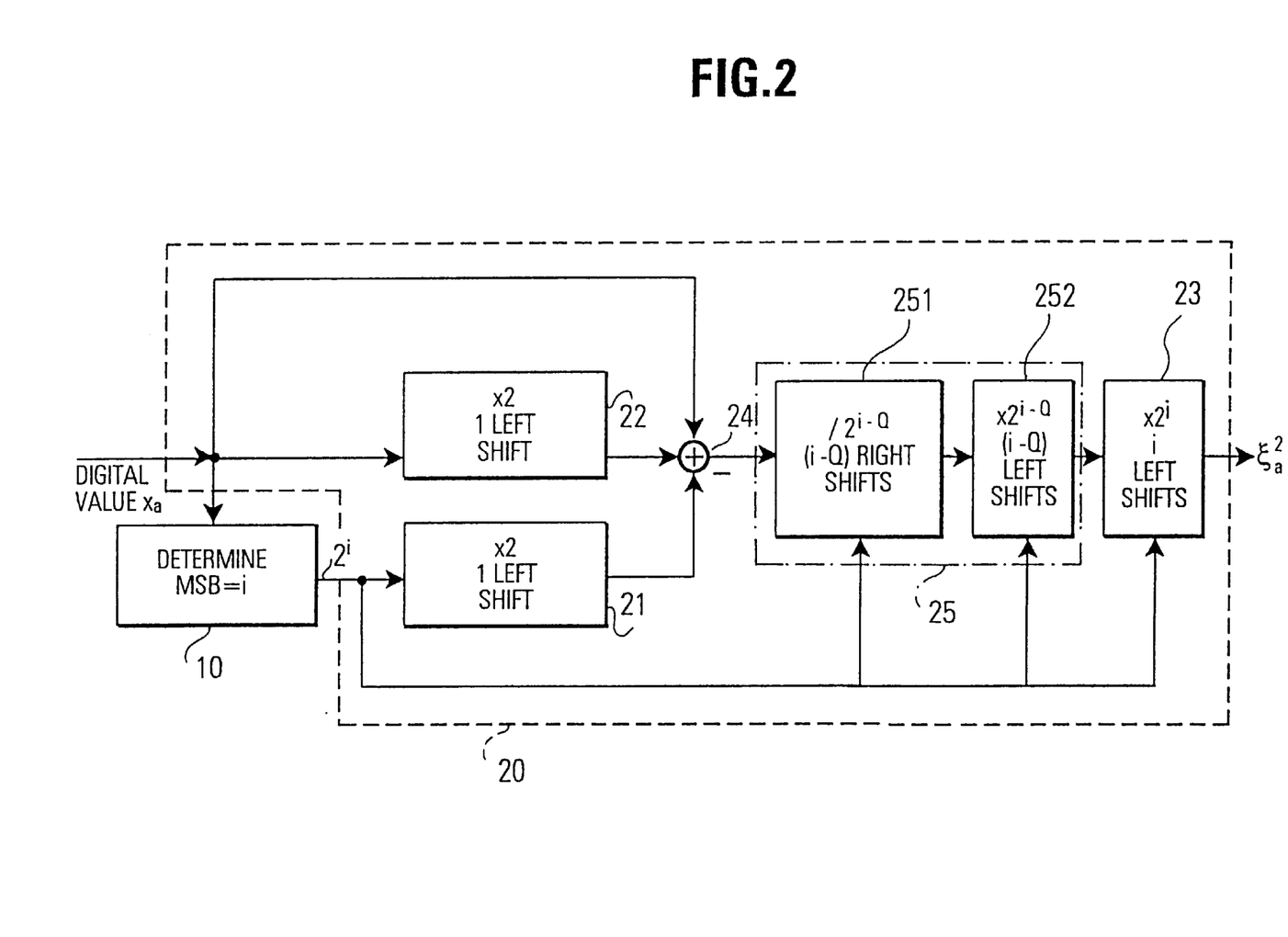
FIG. 2 shows a block diagram of another embodiment of the invention.

FIG. 2 shows another embodiment of the present invention. Elements in FIG. 2 that are identical to elements already explained in connection with FIG. 1 carry the same reference numerals and shall not be described again. The difference between the embodiment of FIG. 2 and the embodiment of FIG. 1 lies in the arrangement of FIG. 2 additionally having a masking circuit 25 for generating a modified second processing value on the basis of the above mentioned second processing value $(3x_a - 2^{i+1})$. More specifically, the masking means masks a predetermined number i-Q of less significant bits from the digital value at its input, such that these less significant bits are all reset.

Preferably the masking means 25 comprises a dividing and truncating means 251 and a multiplication means 252, as indicated in FIG. 2. More specifically, the dividing and truncating circuit 251, into which the second processing value $(3x_a - 2^{i+1})$ is input, performs a division by $2^{i-Q}$ by executing (i-Q) right shifts on the second processing value, to thereby truncate the i-Q least significant bits. The multiplication means 252 then performs a multiplication by $2^{i-Q}$ to return the most significant bit back to its original position. Again this is preferably done by a shift operation, in this case (i-Q) left shifts. The result of this operation is a modified second processing parameter $$2^{i-Q} \lfloor (3x_a - 2^{i+1})/2^{i-Q} \rfloor \qquad (8)$$

where $\lfloor \ \rfloor$ indicates the truncating operation. It should be noted that the masking operation of the masking means 25 can be performed or implemented in any suitable or desired way, but the above described specific operation of elements 251 and 252 is preferable, because it allows simple operation steps and a simple hardware.

Figure 6:
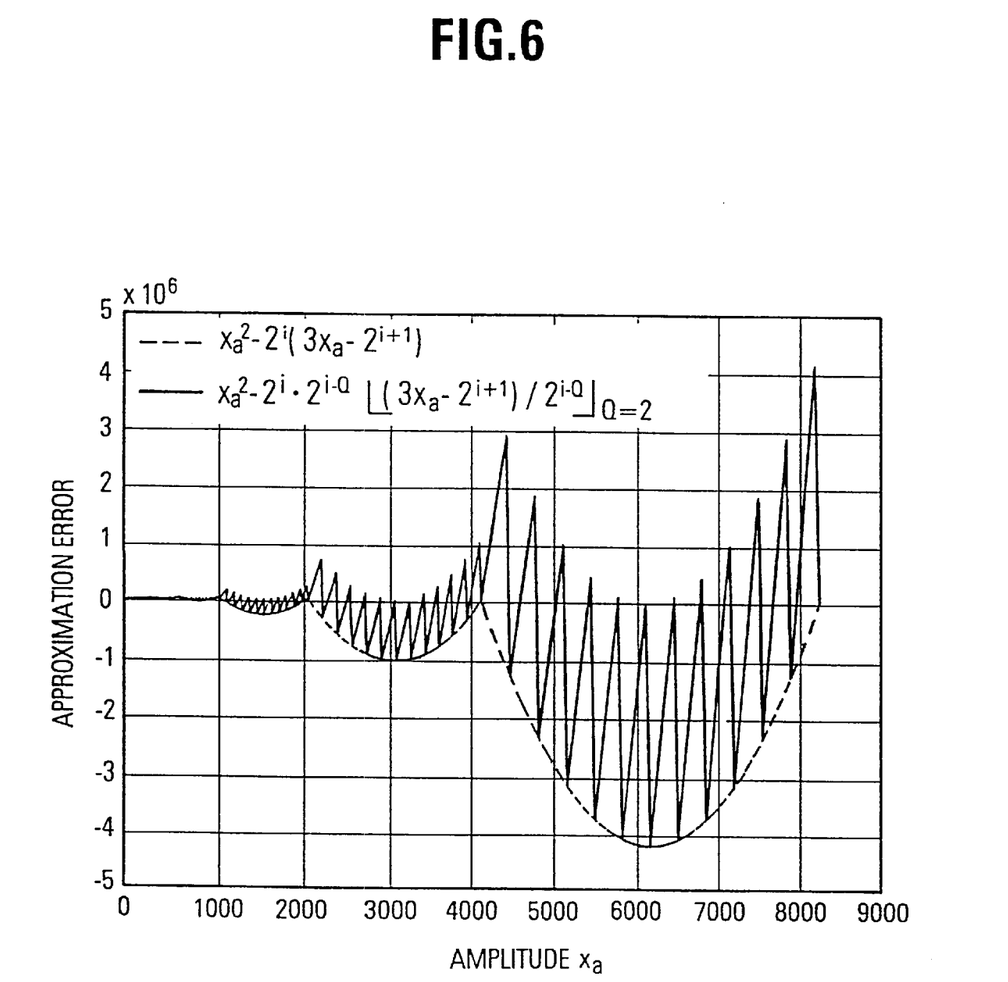
FIG. 6 shows the approximation error as a function of the amplitude $x_a$ for the above mentioned embodiments.

FIG. 6 shows the approximation error $x_a^2 - \xi_a^2$ for values of $\xi_a^2$ determined by simply multiplying the first and second processing values, and for values of $\xi_a^2$ calculated by multiplying the first processing value by the modified second processing value. The truncating parameter Q used for the results shown in FIG. 6 was 2. As can be seen, regardless of the actual value $x_a$, the error curve for the simple linear approximation of the square value (dashed line) always results in a zero or negative approximation error. This is readily understandable from FIG. 5, as the linear approximation between points $x_i$ and $x_{i+1}$ always lies above the curve $y=x^2$, so that the estimates $\xi_a^2$ are always larger than $x_a^2$. The approximation error when additionally employing the masking operation explained in connection with FIG. 2 is shown in FIG. 6 as the curve with a solid line. As can be seen, due to the masking operation the values of the approximation error $x_a^2 - \xi_a^2$ are more balanced, because positive values also occur. This has the effect that if the squares of several digital values are estimated, the average of the estimated squares will more precisely match the average of the digital values.

In this connection it may be noted that the masking operation masks the i-Q least significant bits. This means that the number of masked bits depends on the magnitude of $x_a$: if $x_a$ is large, then many bits are masked, and if $x_a$ is small, then only few or no bits will be masked. This effect is evident in FIG. 6.

Measurements show that the best performance is achieved by employing a truncating parameter Q=2.

As can also be seen from FIG. 6, in general the magnitude of the approximation error tends to become larger with larger amplitudes $x_a$. This is due to the fact that the anchor points $2^i$ become less dense at higher amplitude values $x_a$. In other words, this is due to the fact that the anchor points are not evenly spread out on the x axis. Due to this fact, the digital value processor and digital value processing method of the invention are especially well-applicable to digital signals, in which the occurrence of larger magnitudes of digital values is less frequent or less probable than smaller values. In such a case the larger approximation error for large magnitudes does not have a strong influence on an accumulated and averaged number of estimates $\xi_a^2$.

Figure 3:
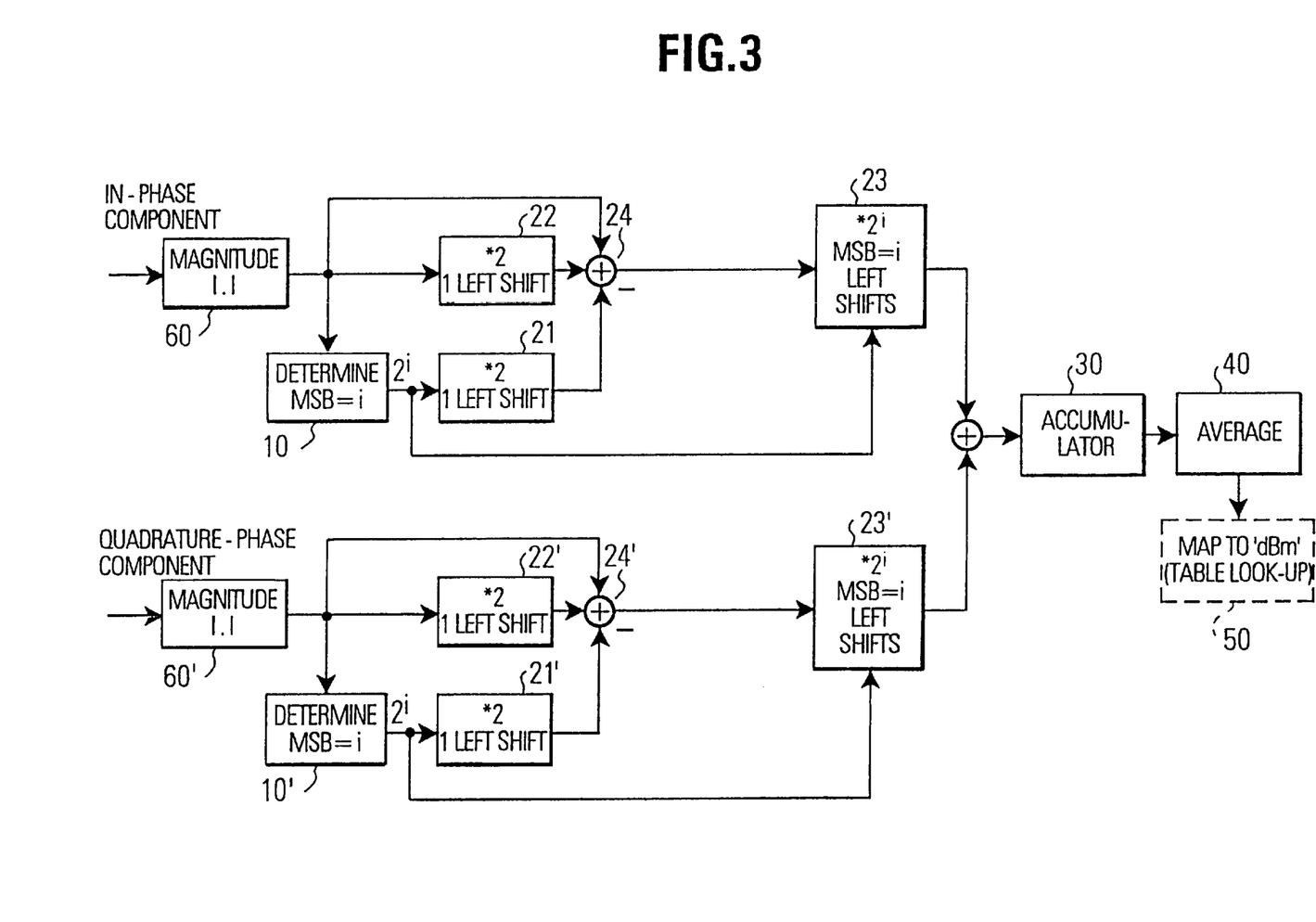
FIG. 3 shows an embodiment of the invention based on the above mentioned embodiment of FIG. 1.

Preferably, the above described embodiments are employed in power estimating devices for estimating the mean transmitted power of a digital signal, where said digital signal is being provided to a transmitter. FIG. 3 shows the application of the value processor of FIG. 1 for such a power estimating circuit, and FIG. 4 shows the application of the digital value processor of FIG. 2 in such a power estimating circuit.

FIG. 3 shows a mean signal power estimating device that receives two components, namely an in-phase component and a quadrature-phase component, in respective magnitude determining devices 60 and 60'. It may be noted that FIG. 3 uses the same reference numerals as FIG. 1, where the addition of a prime relates to the circuit handling the quadrature-phase component. As can be seen, the estimates of the squares of the in-phase component and quadrature-phase component output by the circuits 23 and 23' are added and provided to an accumulator 30, which is set to accumulate a predetermined number of estimates. The accumulated values are then averaged in an averaging circuit 40. Finally, in order to produce a mean power estimate, the averaging results from circuit 40 are mapped to dBm or any other appropriate unit of measure by a suitable look-up table.

Figure 4:
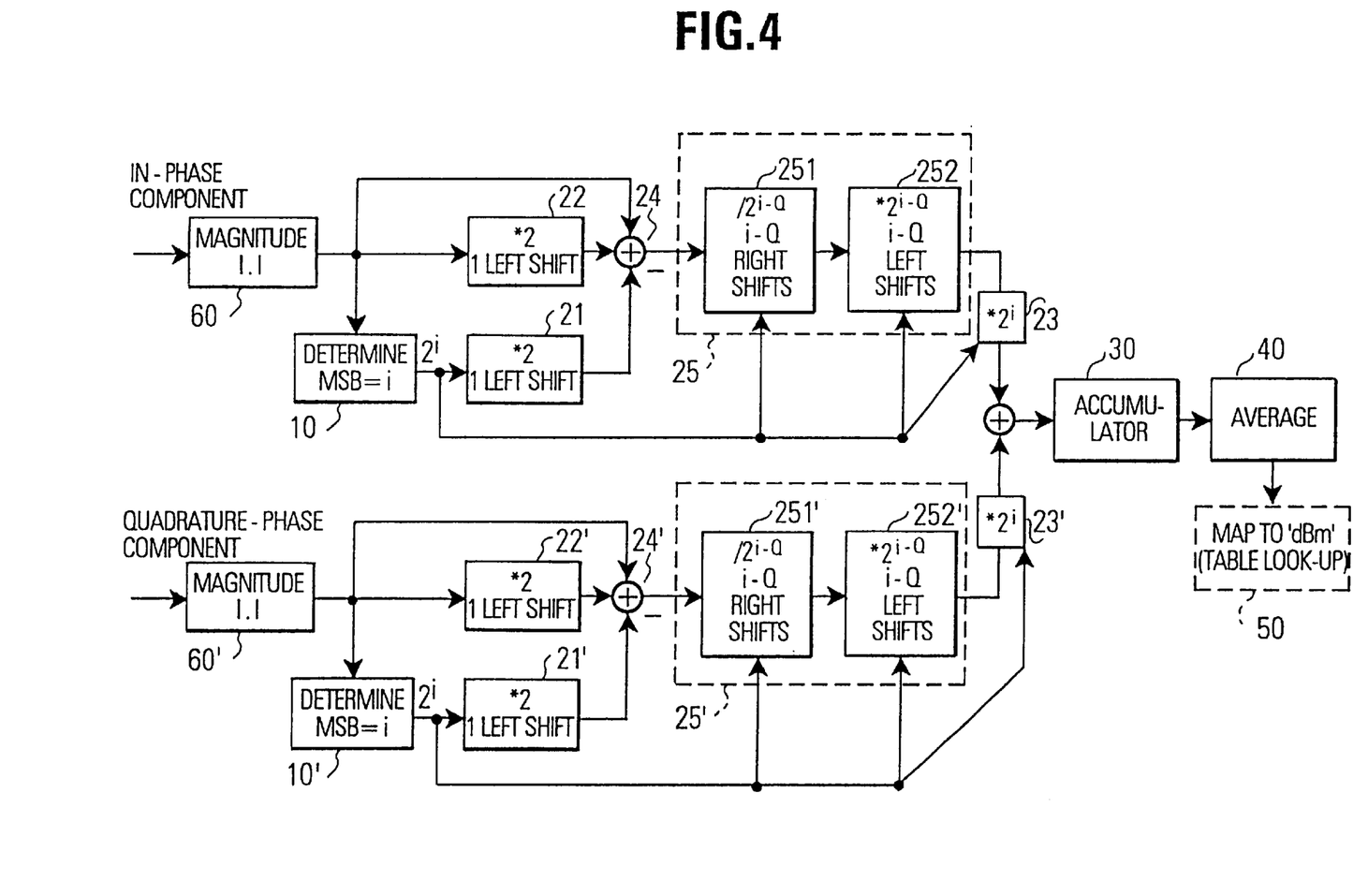
FIG. 4 shows an embodiment of the invention based upon the above mentioned embodiment of FIG. 2.

FIG. 4 shows a mean signal power estimating device based on the digital value processor of FIG. 2. Regarding the provision of two value processors for an in-phase component and quadrature-phase component, respectively, and regarding an accumulator 30, an averaging means 40 and a look-up table 50, the embodiment of FIG. 4 is essentially similar to that of FIG. 3. The difference between the arrangement of FIG. 4 and of FIG. 3 consists in the fact that FIG. 4 additionally contains the masking means 25 and 25'.

As already mentioned previously, the device and method of the present invention is preferably applied to the power measurement of signals, in which the magnitudes are not evenly distributed over the entire range of magnitudes. Digital signals that show such a behavior, are e.g. CDMA (code division multiple access) signals consisting of so-called weighted chips. These signals will typically have a distribution of magnitudes that is centered around the average value, which is due to the fact that the chips are calculated under a constraint given by a maximum output power of the transmitter. In other words, the rate of occurrence for a specific magnitude of a weighted chip increases for magnitudes approaching the average magnitude. According to the central limit theorem, the more individual (CDMA) signals are added, the more a Gaussian distribution is met.

Although the present invention has been described on the basis of specific embodiments, the invention is by no means restricted thereto, and is much rather defined by the appended claims. Reference signs and reference numerals in the claims are intended for making the claims easier to understand and do not restrict the scope.

What is claimed is:

1. A digital value processor for estimating the square of a digital value, comprising:
   a determining device for determining an integer such that the magnitude of said digital value lies between 2 raised to the power of said integer and 2 raised to the sum of 1 and said integer, and for calculating a first processing value as 2 raised to the power of said integer, and
   a calculating device for calculating a second processing value which is equal to the difference between 3 times the magnitude of said digital value and 2 raised to the sum of said integer and 1, where an estimate of the square of said digital value is determined on the basis of said first and second processing values.

2. A digital value processor according to claim 1, wherein said determinining device is arranged to detect the most significant bit of the magnitude of said digital value and to determine said integer on the basis of said most significant bit.

3. A digital value processor according to claim 1, wherein said calculating device comprises an adder and a left shifter, and is arranged to perform the calculation of said second processing value only on the basis of adding operations and left shift operations.

4. A digital value processor according to claim 1, wherein said calculating device is arranged to calculate said estimate as the product of said first processing value and said second processing value.

5. A digital value processor according to claim 4, wherein said calculating device is arranged to calculate the product of said first processing value and said second processing value through left shift operations.

6. A digital value processor according to claim 1, wherein said calculating device comprises a masking device for masking less significant bits in said second processing value to generate a modified second processing value, and said calculating device is arranged to calculate said estimate as the product of said first processing value and said modified second processing value.

7. A digital value processor according to claim 6, wherein said masking device is arranged to perform a truncating operation.

8. A digital value processor according to claim 7, wherein said masking device comprises a right shifter and a left shifter, and is arranged such that said truncating operation comprises dividing said second processing value by 2 raised to the difference of said integer and a truncating parameter in said right shifter in order to generate a truncated value, and multiplying said truncated value by 2 raised to the difference of said integer and said truncating parameter in said left shifter in order to generate said modified second processing parameter.

9. A digital value processor according to claim 8, wherein said truncating parameter is equal to 2.

10. A mean signal power estimating device for estimating the transmitting power of a digital signal to be sent to a transmitter, where said digital signal comprises a plurality of digital values, comprising:
    a digital value processor according to claim 1 for estimating the square of the digital values,
    an accumulator for accumulating a prescribed number of estimated squares of said digital values, and
    an averager for averaging the accumulated values.

11. A mean signal power estimating device according to claim 10, further comprising a mapper for mapping the averaged values to an absolute power value.

12. A mean signal power estimating device according to claim 10, wherein said mean signal power estimating device is incorporated in a CDMA system, and wherein said digital values are weighted chips.

13. A mean signal power estimating device according to claim 10, wherein said digital signal is such that the rate of occurrence for a specific magnitude of a digital value in said digital signal increases for magnitudes approaching the average magnitude of values in said digital signal.

14. A mean signal power estimating device according to claim 10, wherein said digital signal is such that the rate of occurrence for a specific magnitude of a digital value in said digital signal decreases for increasing magnitudes.

15. A digital value processing method for estimating the square of a digital value, comprising:
    determining an integer such that the magnitude of said digital value lies between 2 raised to the power of said integer and 2 raised to the sum of 1 and said integer,
    calculating a first processing value as 2 raised to the power of said integer,
    calculating a second processing value as the difference between 3 times the magnitude of said digital value and 2 raised to the sum of said integer and 1, and
    determining an estimate of the square of said digital value on the basis of said first and second processing values.

16. A method according to claim 15, wherein said determining step is done by detecting the most significant bit of the magnitude of said digital value and determining said integer on the basis of said most significant bit.

17. A method according to claim 15, wherein said the calculation of said second processing value is performed only on the basis of adding operations and left shift operations.

18. A method according to claim 15, wherein said estimate is calculated as the product of said first processing value and said second processing value.

19. A method according to claim 18, wherein the product of said first processing value and said second processing value is calculated through left shift operations.

20. A method according to claim 15, wherein said calculating step comprises a masking step for masking less significant bits in said second processing value to generate a modified second processing value, and said estimate is calculated as the product of said first processing value and said modified second processing value.

21. A method according to claim 20, wherein said masking step comprises a truncating step for performing a truncating operation.

22. A method according to claim 21, wherein said truncating operation comprises dividing said second processing value by 2 raised to the difference of said integer and a truncating parameter in order to generate a trucated value, and multiplying said truncated value by 2 raised to the difference of said integer and said truncating parameter to generate said modified second processing parameter.

23. A method according to claim 22, wherein said truncating parameter is equal to 2.

* * * * *